United States Patent
Wiklund

(10) Patent No.: US 8,175,754 B2
(45) Date of Patent: May 8, 2012

(54) CONFIGURATION OF A MULTIVARIABLE PROCESS FLUID FLOW DEVICE

(75) Inventor: David E. Wiklund, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 266 days.

(21) Appl. No.: 12/470,829

(22) Filed: May 22, 2009

(65) Prior Publication Data

US 2009/0292400 A1 Nov. 26, 2009

Related U.S. Application Data

(60) Provisional application No. 61/055,709, filed on May 23, 2008.

(51) Int. Cl.
G05D 9/00 (2006.01)
G05D 7/00 (2006.01)
G01F 25/00 (2006.01)
G01P 21/00 (2006.01)

(52) U.S. Cl. .......... 700/281; 700/282; 700/284; 702/85; 702/100; 137/2; 137/392; 73/1.16; 73/1.35

(58) Field of Classification Search .......... 700/281–284; 702/45, 55, 85, 100; 137/2–5, 392; 73/1.16, 73/1.24, 1.34–1.36, 1.73, 1.74
See application file for complete search history.

(56) References Cited

U.S. PATENT DOCUMENTS

| | | | |
|---|---|---|---|
| 4,249,164 A | 2/1981 | Tivy | 340/870.3 |
| 4,551,719 A * | 11/1985 | Carlin et al. | 340/3.7 |
| 4,996,871 A * | 3/1991 | Romano | 73/32 A |
| 5,835,379 A * | 11/1998 | Nakano | 700/197 |
| 6,068,612 A | 5/2000 | Bowman et al. | 604/122 |
| 6,092,409 A * | 7/2000 | Patten et al. | 73/1.34 |
| 6,182,019 B1 | 1/2001 | Wiklund | 702/100 |
| 6,990,414 B2 * | 1/2006 | Belke et al. | 702/45 |
| 7,043,374 B2 * | 5/2006 | Wang et al. | 702/45 |
| 7,080,544 B2 * | 7/2006 | Stepanik et al. | 73/31.02 |
| 7,258,024 B2 * | 8/2007 | Dimarco et al. | 73/861.22 |
| 2004/0173091 A1 | 9/2004 | Belke et al. | 95/1 |
| 2004/0207637 A1 * | 10/2004 | Pauly et al. | 345/619 |

(Continued)

FOREIGN PATENT DOCUMENTS

JP 2006185077 7/2006

(Continued)

OTHER PUBLICATIONS

Official Communication from European patent application No. 09751666.0 dated Jan. 13, 2011.

(Continued)

*Primary Examiner* — Ramesh Patel

(74) *Attorney, Agent, or Firm* — Christopher R. Christenson; Westman, Champlin & Kelly, P.A.

(57) ABSTRACT

A method of providing configuration information for a process fluid flow device is provided. The method includes receiving a process fluid selection and providing at least one selectable fluid property relative to the selected process fluid and receiving at least one process fluid property selection. Information relative to a primary element is also received. Reception of a reset relative to the process fluid selection, the process fluid property, and the primary element selection, clears the respective information. The configuration information is provided to a process fluid flow device based on the process fluid selection, the process fluid property and the primary element information.

10 Claims, 5 Drawing Sheets

U.S. PATENT DOCUMENTS

2006/0201430 A1    9/2006  Davis ..................... 119/14.02

FOREIGN PATENT DOCUMENTS

| JP | 2006214789 | 8/2006 |
|---|---|---|
| WO | WO 2004/072621 | 8/2004 |
| WO | WO 2005/062003 | 7/2005 |
| WO | WO 2006/020870 | 2/2006 |
| WO | WO 2006/073388 | 7/2006 |

OTHER PUBLICATIONS

Quick Installation Guide Rosemount 3095 MultiVariable "Rosemount 3095 MultiVariablen™ Mass Flow Transmitter with Hart or Foundation Fieldbus Protocol; Rosemount 3095 Mass Flowmeter Electronics," by Rosemount Inc., by Eden Prairie, MN 55344, Jan. 2005, pp. 1-20.

International Search Report and Written Opinion for international patent application No. PCT/US2009/045005, dated Aug. 20, 2009.

First Communication for the corresponding European patent application No. 09751666.0 dated Dec. 13, 2011.

Official Action issued for the related Russian patent application No. 2010152523 transmitted on Feb. 22, 2012.

First Office Action issued for the related Japanese patent application No. 2011510727 dated Feb. 14, 2012.

First Office Action issued for the related Chinese patent application No. 200980118870.6 dated Feb. 13, 2012.

\* cited by examiner

CONFIGURATION OF A MULTIVARIABLE PROCESS FLUID FLOW DEVICE

CROSS-REFERENCE TO RELATED APPLICATION

The present application is based on and claims the benefit of U.S. provisional patent application Ser. No. 61/055,709, filed May 23, 2008, the content of which is hereby incorporated by reference in its entirety.

BACKGROUND

In industrial settings, control systems are used to monitor and control inventories of industrial and chemical processes and the like. Typically, the control system performs these functions using field devices distributed at key locations in the industrial process coupled to the control circuitry in the control room by a process control loop. The term "field device" refers to any device that performs a function in a distributed control or process monitoring system used in the measurement, control, and monitoring of industrial processes. Typically, field devices are characterized by their ability to operate outdoors for extended periods of time, such as years. Thus, a field device is able to operate in a variety of climatological extremes, including severe temperature extremes and extremes in humidity. Moreover, field devices are able to function in the presence of significant vibration, such as vibration from adjacent machinery. Further, field devices may also operate in the presence of electromagnetic interference.

One example of a field device is a multivariable process fluid flow device, such as that sold under the trade designation Model 3051 SMV Multivariable Transmitter by Emerson Process Management of Chanhassen, Minn. Multivariable process fluid flow devices can compute mass flow rate through differential producers for liquids and gases. Generally, such computation requires measurement of the differential pressure across the differential pressure producer, as well as measurement of the static or line pressure and the temperature of the process fluid.

The general equation for calculating flow rate through a differential producer can be written as:

$$Q = NC_d E Y_1 d^2 \sqrt{\rho h}$$

where:
Q=Mass flow rate (mass/unit time)
N=Units conversion factor (units vary)
$C_d$=Discharge coefficient (dimensionless)
E=Velocity of approach factor (dimensionless)
$Y_1$=Gas expansion factor (dimensionless)
d=Bore of differential producer (length)
$\rho$=Fluid density (mass/unit volume)
h=Differential pressure (force/unit area)

Of the terms in this expression, only the units conversion factor, which is a constant, is simple to calculate. The other terms are expressed by equations that range from relatively simple to very complex. Some of the expressions contain many terms and require the raising of numbers to non-integer powers. This is a computationally intensive operation.

It is desirable to have the process fluid flow device operate compatibly with as many types of differential producers as possible. Further, it is also desirable to provide a process fluid flow device that is able to measure flow rate for a variety of process fluids over a variety of operating conditions.

In order to accurately measure a process fluid flowing through a differential producer, not only must differential pressure, static or line pressure, and temperature be measured very accurately, but substantial information about the differential pressure producer itself and the process fluid are required. Further, some of the required information may be difficult for a technician to locate and/or extrapolate to the operating range. Thus, providing a process fluid flow device with the requisite a priori information could be extremely difficult and time consuming. Fortunately, this process is aided considerably by a software application available from Emerson Process Management, sold under the trade designation Engineering Assistant. This software application includes a database of various parameters relative to common differential pressure producers and process fluids. Thus, a technician need only couple a process fluid flow device to a computer running the software application and follow a configuration wizard that requests various pieces of information and automatically provides process fluid flow device configuration information, such as polynomial coefficients, to the process fluid flow device. One of the complexities of configuring a process fluid flow device is that data entered by the technician as well as calculations performed by the software may generate warnings or otherwise affect other parameters. For example, the fluid density may be able to be calculated appropriately in a default operating range, but if a technician indicates that the process fluid flow device will measure fluid in a range that is outside the default range, fluid density may not be able to be calculated with the requisite accuracy. Accordingly, the software may warn the user with respect to the operating range provided. Thus, while the process of guiding a technician through configuration of a process fluid flow device can generally be effected in a relatively linear fashion, the interrelatedness of the various data entered, and warnings provided, may cause the technician to wish to return to an earlier step to make a change. This can become confusing given the interrelatedness of all of the data.

A system and method that provides more user friendly configuration of a complex process fluid flow device would benefit the industrial process fluid flow field.

SUMMARY

A method of providing configuration information for a process fluid flow device is provided. The method includes receiving a process fluid selection and providing at least one selectable fluid property relative to the selected process fluid and receiving at least one process fluid property selection. Information relative to a primary element is also received. Reception of a reset relative to the process fluid selection, the process fluid property, and the primary element selection, clears the respective information. The configuration information is provided to a process fluid flow device based on the process fluid selection, the process fluid property and the primary element information.

DETAILED DESCRIPTION OF ILLUSTRATIVE EMBODIMENTS

Figure 1:
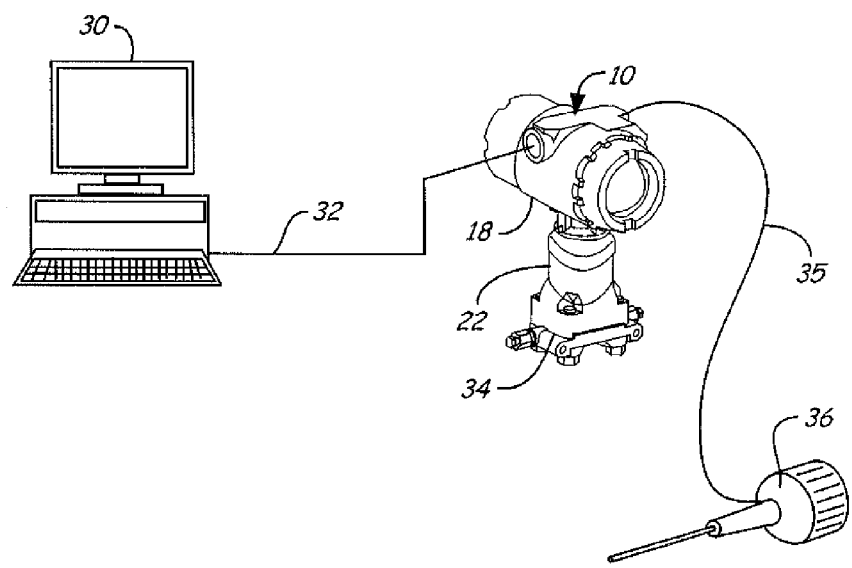
FIG. 1 is a diagrammatic view of a general purpose computer operably coupled to process fluid flow device.

FIG. 1 is diagrammatic view of a process fluid flow device with which embodiments of the present invention are particularly useful. Device 10 includes electronics module 18 and sensor module 22 which collectively house a process fluid flow device. Electronics module 18 also preferably includes a port for accepting an input from a resistive temperature device (RTD), preferably a 100 ohm RTD which is typically inserted directly into the pipe or into a thermowell which is inserted into a pipe to measure the process fluid temperature. The wires from the RTD are connected to one side of a terminal block in temperature transducer 36. To the other side of the terminal block are connected wires which run through an electrical conduit 35.

Sensor module 22 includes a differential pressure sensor and an absolute pressure sensor. The differential pressure sensor and absolute pressure sensor provide pressure signals to conditioning and digitizing circuitry, and to a linearizing and compensating circuit. The compensated, linearized and digitized signals are provided to the electronics module 18. The electronics module 18 in process fluid flow device 10 provides an output signal indicative of process conditions of the process fluid flowing through the pipe to a remote location, by a 4-20 mA two-wire loop preferably formed using twisted pair conductors, through a flexible conduit (not shown). In one embodiment, device 10 provides signals which are indicative of the three process variables (temperature, static pressure, and differential pressure) according to the HART® or FOUNDATION™ Fieldbus Standards. Further, in accordance with an embodiment of the present invention, process fluid flow device 10 also provides an output signal indicative of flow.

FIG. 1 illustrates a general purpose computer 30 being operably coupled to process fluid flow device 10 through link 32. General purpose computer 30 can be any suitable computing device such as a desktop computer, laptop computer, or a mobile device. Computer 30 includes software installed thereon that facilitates initial configuration of process fluid flow devices. One example of such software is sold under the trade designation Engineering Assistant from Emerson Process Management of Chanhassen, Minn. The Engineering Assistant software employs a process communication adapter, such as a HART® modem, or a FOUNDATION™ Fieldbus communication card. The adapter in computer 30 creates a process communication link 32 through which a technician may interact with process fluid flow device 10. Device 10 is a multivariable field device that is able to measure a plurality of process fluid variables. Preferably, pressures are measured via manifold 34 and process fluid temperature is measured via temperature transducer 36. Coupled to a suitable differential pressure producer such as an orifice plate, the pressure measured on opposite sides of the orifice plate while process fluid flows therethrough can be related to the process fluid flow rate in accordance known techniques.

During setup of device 10, the technician will typically configure a number of features of the flow device. Such features include selection of measurement units, selection of a process fluid, verification of fluid properties, and selection of a primary element size and geometry. These various selections correspond with data stored in a database that results in the proper coefficients for calculating mass fluid flow being provided to process fluid flow device 10 through communication link 32.

When the technician performs a new configuration of a process fluid flow device using the Engineering Assistant configuration software, all of the selections made and data entered are new information. Accordingly, there is no state to which the technician wishes to return during the first pass through the sequential configuration process. However, there are situations where the user may wish to undo selections and return to an original state with all selections and entered data intact. A number of such situations are described below.

A first situation occurs during the initial configuration process, where the technician may wish to return to a completed screen. For example, the technician may return to the fluid selection screen after exiting the fluid properties screen or the technician may wish to return to the gas composition entry screen while working on the primary element selection screen. Essentially, the technician may wish to return to an earlier step in the configuration process.

Another situation occurs when the technician wishes to return to an original state where the user has opened an existing process fluid flow device configuration file.

Finally, another situation occurs when the technician wishes to return to an earlier or original state where the technician has uploaded a configuration from a process fluid flow device.

In all of these cases, it is desirable for the technician to be able to make changes and experiment with configuration parameters while being able to return to an original state if the technician chooses to not retain the changes. Accordingly, embodiments of the present invention generally provide interaction with the user allowing an intuitive ability to return to an earlier state and/or an ability to specifically save or checkpoint a given arrangement.

Figure 2:
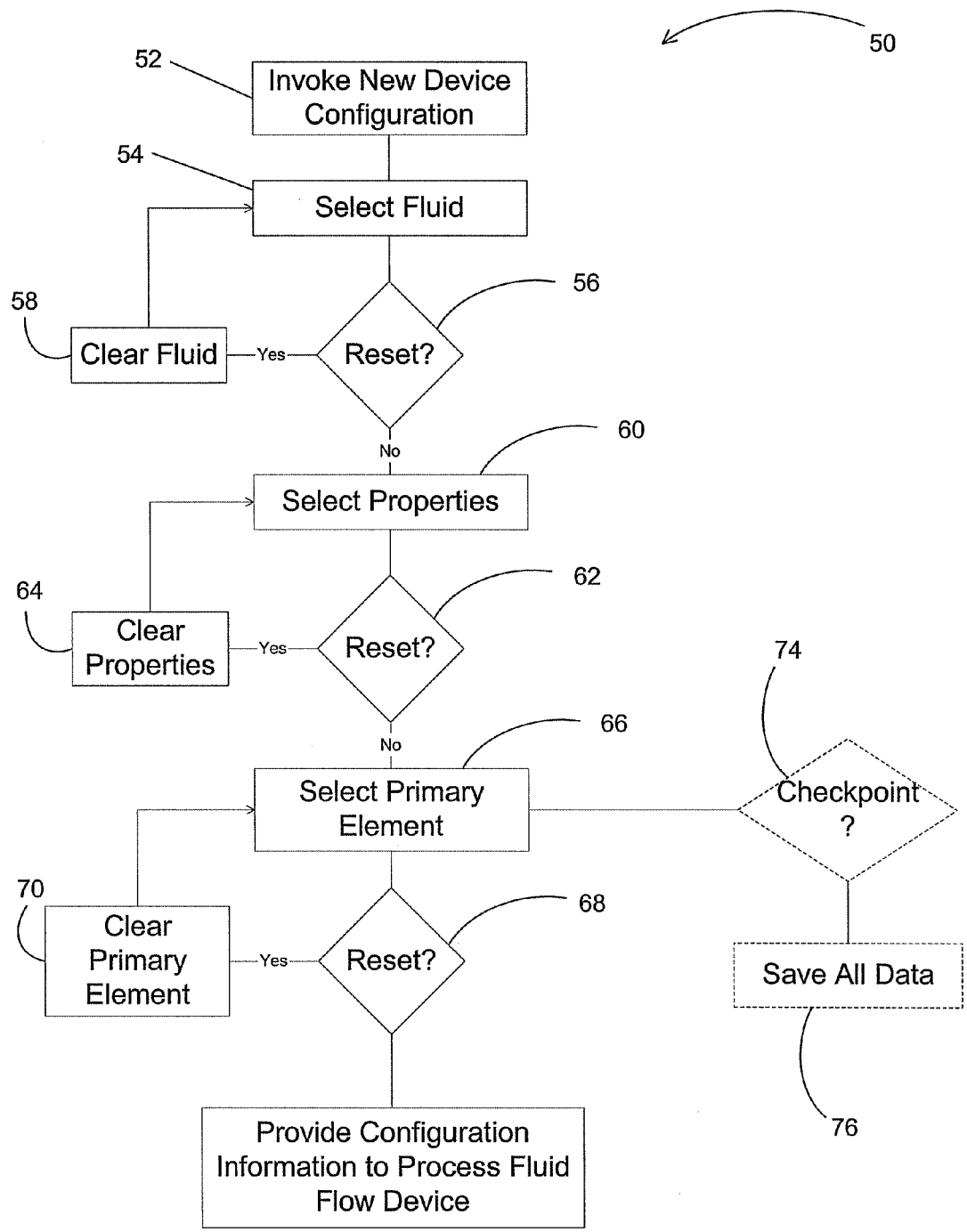
FIG. 2 is a flow diagram of a method of configuring a process fluid flow device in accordance with embodiments of the present invention.

FIG. 2 is a flow diagram of a method of configuring a process fluid flow device in accordance with embodiments of the present invention. Method 50 begins at block 52 where a new device configuration wizard or guide is invoked. At block 54, a technician selects a process fluid, the flow of which will be measured by the process fluid flow device. The fluid selected can be a process fluid that has parameters that are stored in a process fluid database or it can be a custom process fluid. At block 56, the technician is provided with the opportunity to reset the process fluid selection. If the technician chooses to reset, control passes to block 58 where the process fluid selection information is cleared and control returns to block 54 where the technician is allowed to select a process fluid. If the technician does not cause a reset, control passes to block 60 where fluid properties relative to the fluid selected in block 54 can be verified. Such properties include, for example, gas compressibility or other suitable parameters. Once fluid properties have been verified or otherwise entered, control passes to block 62 providing the technician with an opportunity to reset the fluid properties selection. If a reset is received, control passes to block 64 where the fluid properties entered by the technician are cleared and control returns to block 60. If no reset is received, control passes to block 66 where primary element selection is performed. Primary element selection can entail entering or otherwise selecting the type and size of the primary element as well as modification to any other suitable parameters relative to the primary element. Once primary element selection is complete, the technician is provided with an opportunity, at block 68, to reset the primary element selection. If a reset is received, control passes to block 70 where the primary element information is cleared and control returns to block 66. If no reset is received, control passes to block 72 where the technician-entered data is provided, for example through link 32 illustrated in FIG. 1, to the process fluid flow device. The process fluid flow device then uses the information, generally in the form of polynomial coefficients, to calculate process fluid flow. In accordance with an optional embodiment, once the primary element selection has been completed in block 66, the technician can also be provided with an ability to establish a checkpoint, as illustrated in block 74. If the user wishes to establish a checkpoint, all information entered can be stored temporarily such that the technician can return to any of the selection screens or steps and make modifications to the data. Then, should the technician choose to reset the modification, the data will revert to that saved at the checkpoint step 76.

Figure 3:
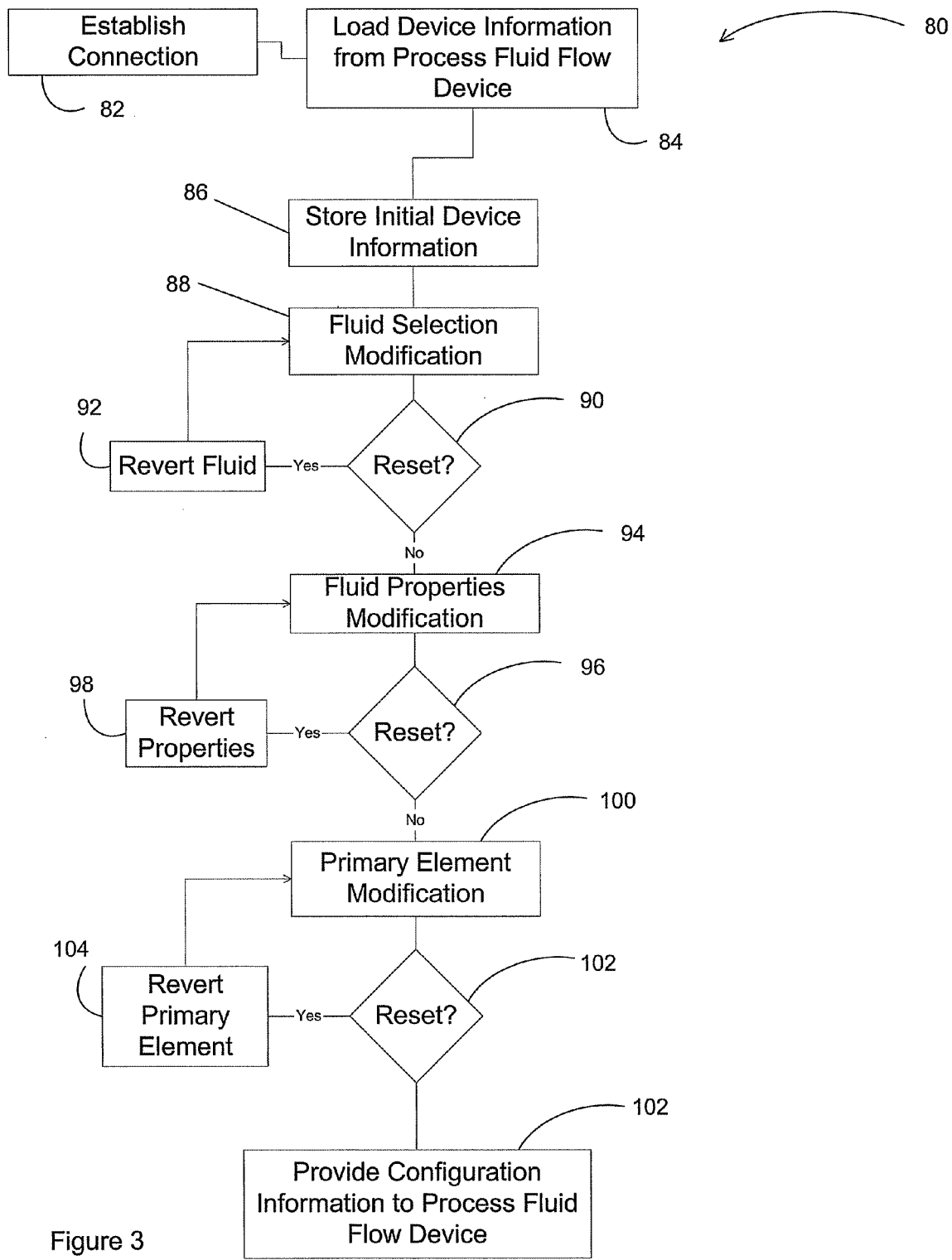
FIG. 3 is a flow diagram of a method of modifying process flow information from a process fluid flow device in accordance with an embodiment of the present invention.

FIG. 3 is a diagrammatic view of a method of modifying process flow information from a process flow device in accordance with an embodiment of the present invention. Method 80 begins at block 82 where a data connection to the process fluid flow device is established. One example of such a data connection is illustrated in FIG. 1 as link 32. Once the connection has been established, control passes to block 84 where information is loaded from the process fluid flow device to a computer or other suitable device. At block 86, the information received from the process fluid flow device is stored as initial device information. Next, at block 88, a revision to the fluid selection information is received from a technician or other suitable entity. Once the fluid selection revision has been received, the technician is afforded the opportunity to generate a reset, as illustrated at block 90. If the reset is received, control passes to block 92 where the fluid selection information is reverted from the revised information to the initial fluid selection information that is stored at block 86. If no reset is received, control passes to block 94 where a fluid property modification can be received. If a fluid property modification is received, the technician is provided, at block 96, with an opportunity to reset that information. If such a reset occurs, control passes to block 98 where the fluid properties information is reverted to the initial information stored at block 86, and control returns to block 94. If no reset is received, control passes to block 100 where primary element modification is received. Next, at block 102, the technician is afforded an opportunity to reset the primary element information. If such a reset is received, control passes to block 104 where the primary element modification is discarded and the primary element information is restored to that stored during block 86 and control returns to block 100. If no reset is received, control passes to block 106 where the revised fluid property information is loaded into the process fluid flow device.

Figure 4:
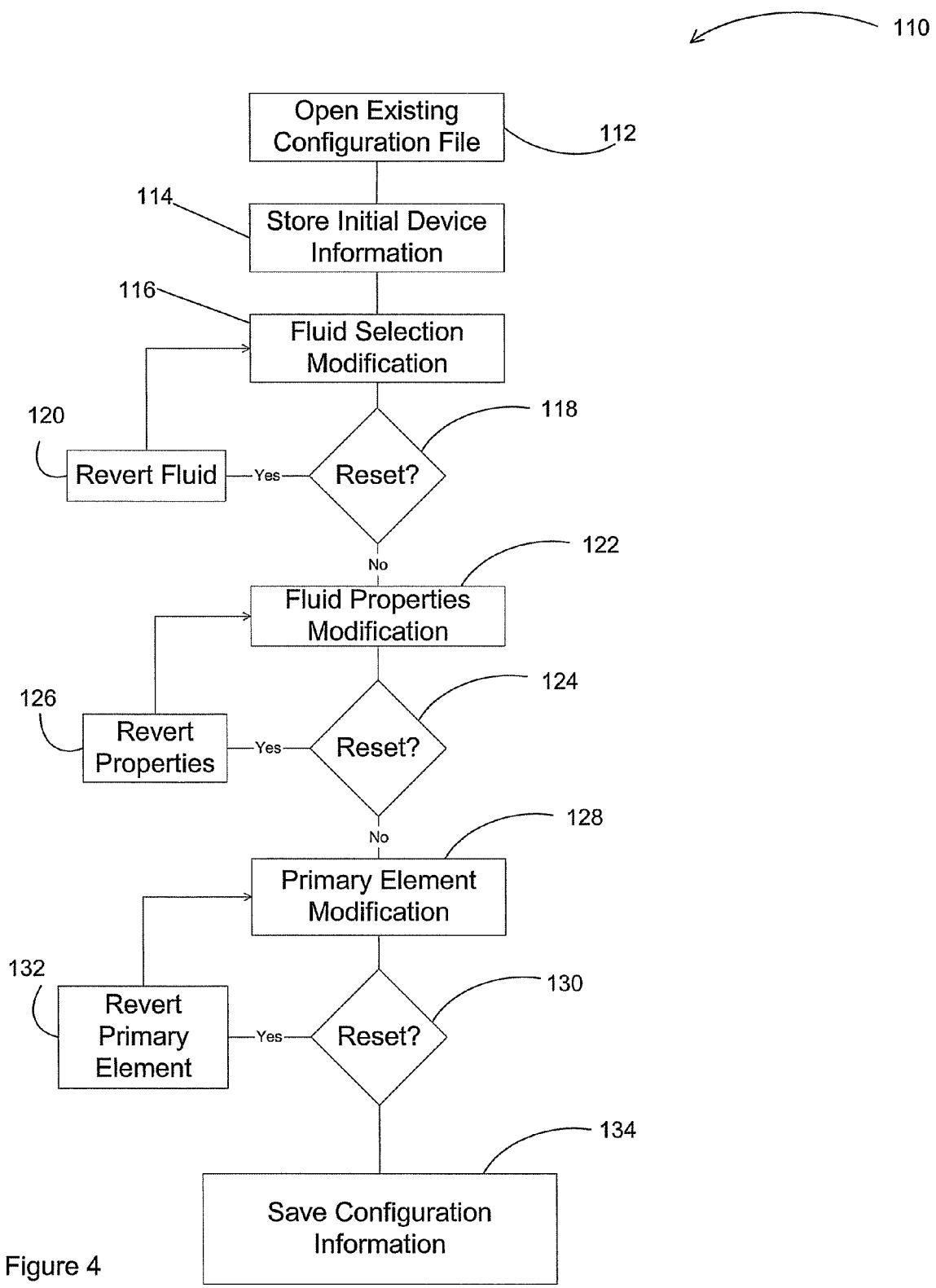
FIG. 4 is a flow diagram of a method of modifying a process fluid flow device configuration file in accordance with an embodiment of the present invention.

FIG. 4 is a flow diagram of a method of modifying a process fluid flow device configuration file in accordance with an embodiment of the present invention. Method 110 bears some similarities to method 80. Method 110 begins at block 112 where an existing process fluid flow device configuration file is opened or otherwise accessed. Then, control passes to block 114 where initial device information from the newly opened or accessed configuration file is stored as initial device information. Next, at block 116, a modification to the initial fluid selection information is received. Once the fluid selection modification has been received, the technician is afforded the opportunity to generate a reset, as illustrated at block 118. If the reset is received, control passes to block 120 where the fluid selection information is reverted from the modified information to the initial fluid selection information that was stored at block 114. If no reset is received, control passes to block 122 where a fluid property modification and/or verification can be received. If a fluid property modification is received, the technician is provided, at block 124, with an opportunity to reset that information. If such a reset occurs, control passes to block 126 where the fluid properties information is reverted to the initial information stored at block 114, and control returns to block 122. If no reset is received, control passes to block 128 where primary element modification information is received. Next, at block 130, the technician is afforded an opportunity to reset the primary element information. If such a reset is received, control passes to block 132 where the primary element modification is discarded and the primary element information is restored to that stored during block 114 and control returns to block 128. If no reset is received, control passes to block 134 where the revised fluid property information is loaded into the process fluid flow device.

Figure 5:
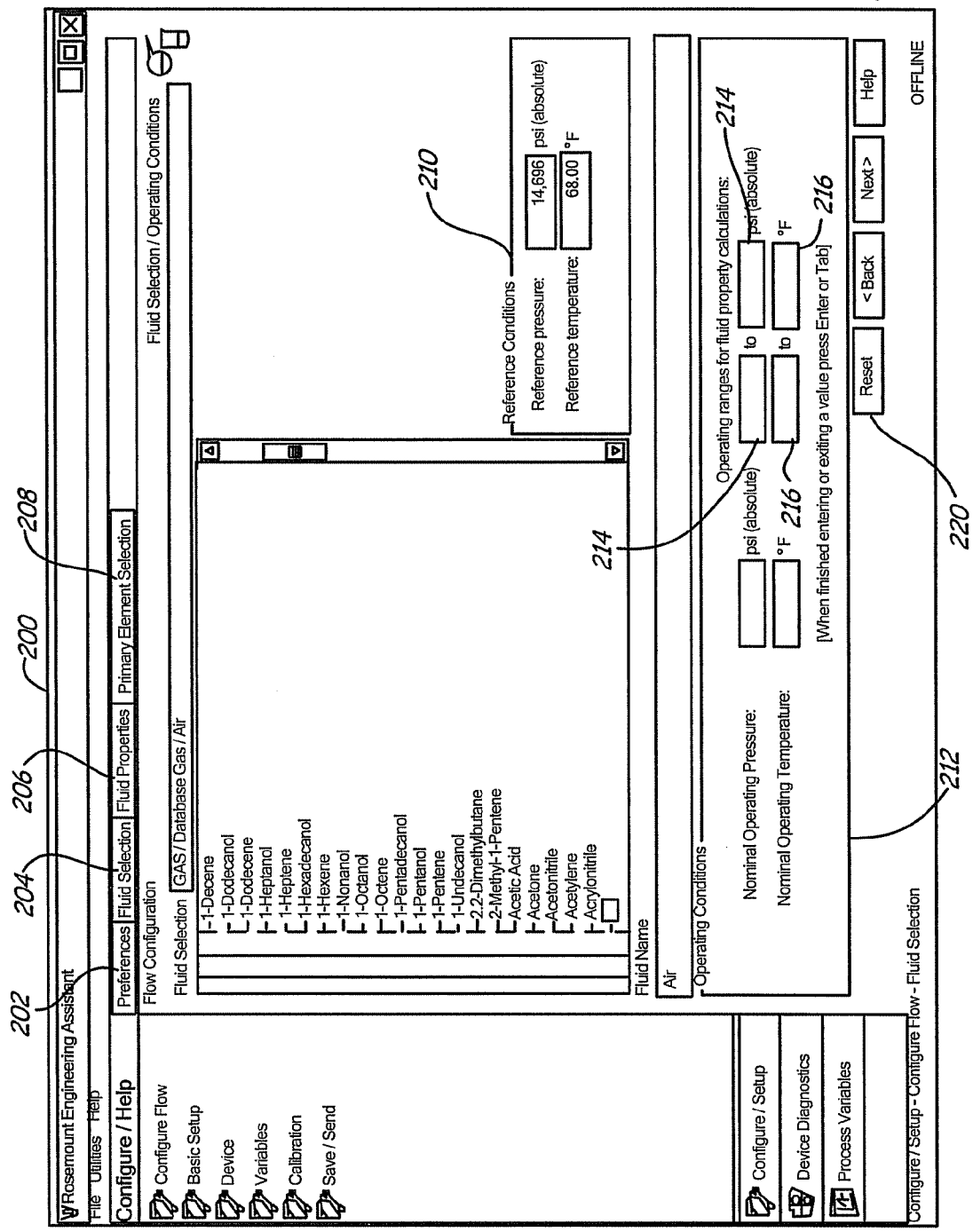
FIG. 5 is a diagrammatic view of a user interface display used with embodiments of the present invention.

FIG. 5 is a diagrammatic view of a user interface used with embodiments of the present invention. Display 200 includes a number of tabs 202, 204, 206, 208 that provide a technician with the ability to enter or view data with respect to: Preferences, Fluid Selection, Fluid Properties, and Primary Element Selection, respectively. As illustrated in FIG. 5, tab 204 has been selected providing the user with the ability to select a process fluid from a database. In the illustrated example, the user has selected a gas, more specifically a database gas, such as air. The database contains information relative to the stored database gas such as density, compressibility, et cetera. The technician is also provided with an ability at portion 210 to enter reference conditions for the selected gas. In the example provided, the technician has entered a reference pressure of 14.696 pounds per square inch (psi) absolute. Additionally, the technician has entered a reference temperature of 68.00 degrees Fahrenheit. Further, the technician is also provided an operating conditions portion 212 that allows the technician to enter a nominal operating pressure and nominal operating temperature. The system preferably provides suggested ranges relative to the normal operating pressures and temperatures in windows 214 and 216, respectively. Additionally, although the system can recommend operating pressure and temperature ranges, the technician is also allowed to modify those values. Based upon an entered operating temperature and pressure, the system may generate a warning indicating the estimated precision of the process fluid flow value, or other relevant variable such as fluid density, based on the entered data. In response to such a warning, the user may wish to change or otherwise reset the fluid selection information. Accordingly, user interface 200 includes a reset feature illustrated at button 220. Should the technician select the reset button 220, the fluid selection information will revert to a previously stored fluid selection information, if there is one, or will clear the fluid selection information as described above with respect to FIGS. 2-4. A similar reset feature is also provided for tabs 206 and 208.

One of the advantages of embodiments of the present invention is the ability to revert to a set of configuration data. This also facilitates the comparison of multiple sets of configuration data. For example, the relative accuracy of different sets of configuration data can be compared. A flow configuration can be read from a file, or from the memory of a process fluid flow device, and the various parameters can be changed by a technician. A software application, such as Engineering Assistant, can provide calculations or analyses relative to the modified parameters so that the user can view the effect of the changes on accuracy, or other suitable variables. If the changes that the user made do not result in an improvement, the user can simply revert to the original configuration data using the reset feature. This is advantageous because the alternative would be entering a first set of configuration data, running an analysis, writing down the results or storing them in some suitable fashion. Then, the second set of configuration data would be entered and analyzed. If the second set does not result in a better configuration, the user would need to re-enter the first set of configuration data. Not only would such a process be cumbersome, but it would be prone to human error.

Although the present invention has been described with reference to preferred embodiments, workers skilled in the art will recognize that changes may be made in form and detail without departing from the spirit and scope of the invention.

What is claimed is:

1. A method of modifying configuration information for a process fluid flow device, the method comprising:
   receiving a process fluid flow device configuration information from a process fluid flow device;
   temporarily saving the process fluid flow device configuration information as initial configuration information;
   receiving a modification to at least one of process fluid selection information, process fluid property information and primary element information wherein the primary element information is indicative of a primary element to be disposed in the selected process fluid to provide a differential pressure related to process fluid flow;
   wherein reception of a reset relative to the process fluid selection, the process fluid property, and the primary element selection, reverts the modified information to initial configuration information; and
   providing modified configuration information to the process fluid flow device based on the modified process fluid selection, the process fluid property and the primary element information.

2. The method of claim 1, wherein the method is implemented on a computer.

3. The method of claim 1, wherein the reset is received from activation of a reset feature on a user interface.

4. The method of claim 1, and further comprising comparing at least one parameter of the initial configuration information with the modification.

5. The method of claim 4, wherein the reset is received after the comparison.

6. A computer-implemented method of modifying configuration information for a process fluid flow device, the method comprising:
   accessing a process fluid flow device configuration file containing process fluid flow device configuration information;
   temporarily saving the process fluid flow device configuration information as initial configuration information;
   receiving a modification to at least one of process fluid selection information, process fluid property information and primary element information;
   wherein reception of a reset relative to the process fluid selection, the process fluid property, and the primary element selection, reverts the modified information to initial configuration information; and
   providing modified configuration information to the process fluid flow device based on the modified process fluid selection, the process fluid property and the primary element information.

7. The method of claim 6 and further comprising receiving a checkpoint request and temporarily saving all entered information.

8. The method of claim 7, wherein a reset received subsequent to the checkpoint reverts reset information to the temporarily saved information.

9. The method of claim 6, and further comprising comparing at least one parameter of the initial configuration information with the modification.

10. The method of claim 9, wherein the reset is received after the comparison.

* * * * *